United States Patent [19]

Onodera

[11] Patent Number: 5,118,005
[45] Date of Patent: Jun. 2, 1992

[54] GARBAGE PROCESSING DEVICE

[75] Inventor: Kazuo Onodera, Okegawa, Japan

[73] Assignee: O. K. Laboratories, Co., Ltd., Okegawa, Japan

[21] Appl. No.: 785,474

[22] Filed: Oct. 31, 1991

[30] Foreign Application Priority Data

Oct. 31, 1990 [JP] Japan .................................. 2-295093

[51] Int. Cl.⁵ .............................................. C05F 9/00
[52] U.S. Cl. .................................. 220/501; 220/908; 71/9; 71/14; 71/901
[58] Field of Search .............. 220/484, 501, 528, 571, 220/408; 71/14, 13, 9, 901

[56] References Cited

U.S. PATENT DOCUMENTS

| | | | |
|---|---|---|---|
| 4,105,412 | 8/1978 | Petzinger | 71/14 X |
| 4,108,609 | 8/1978 | Petzinger | 23/259.1 |
| 4,233,266 | 11/1980 | Kummer | 71/9 X |
| 4,285,719 | 8/1981 | Criss | 71/14 X |
| 4,352,888 | 10/1982 | Tisbo et al. | 71/901 X |
| 4,771,940 | 9/1988 | Taylor | 220/335 |
| 4,984,561 | 1/1991 | Warrington | 71/9 X |
| 5,011,036 | 4/1991 | Souza et al. | 220/908 X |

*Primary Examiner*—Steven M. Pollard
*Attorney, Agent, or Firm*—Weintraub, DuRoss & Brady

[57] ABSTRACT

A garbage disposing device having a collapsible cylindrical main body having an upper end face inclined at such an angle as to be capable of flowing water droplets downward. A flat box-shaped member partitions the inside of the main body into a plurality of vertical chambers. The top end of the member protrudes above the main body. The member has a plurality of perforations in a wall surface thereof. An opening/closing lid is hingedly connected to the upper side of the main body and is attached thereto along the downward slope of the upper end face. Water evaporated from garbage is discharged to the outside through the perforations of the flat box-shaped member. Water which condenses on the inner surface of the opening/closing lid can be introduced along the inclined surface of the lid and then collected into a water receiving port or into grooves of a board core formed in the main body. A plurality of partitioned chambers can be used alternately and continuously for effective disposal of garbage.

14 Claims, 5 Drawing Sheets

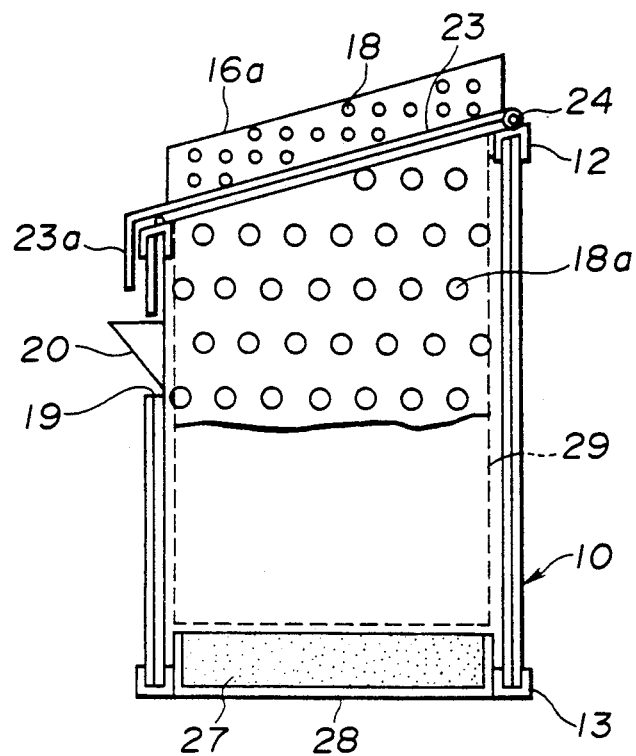
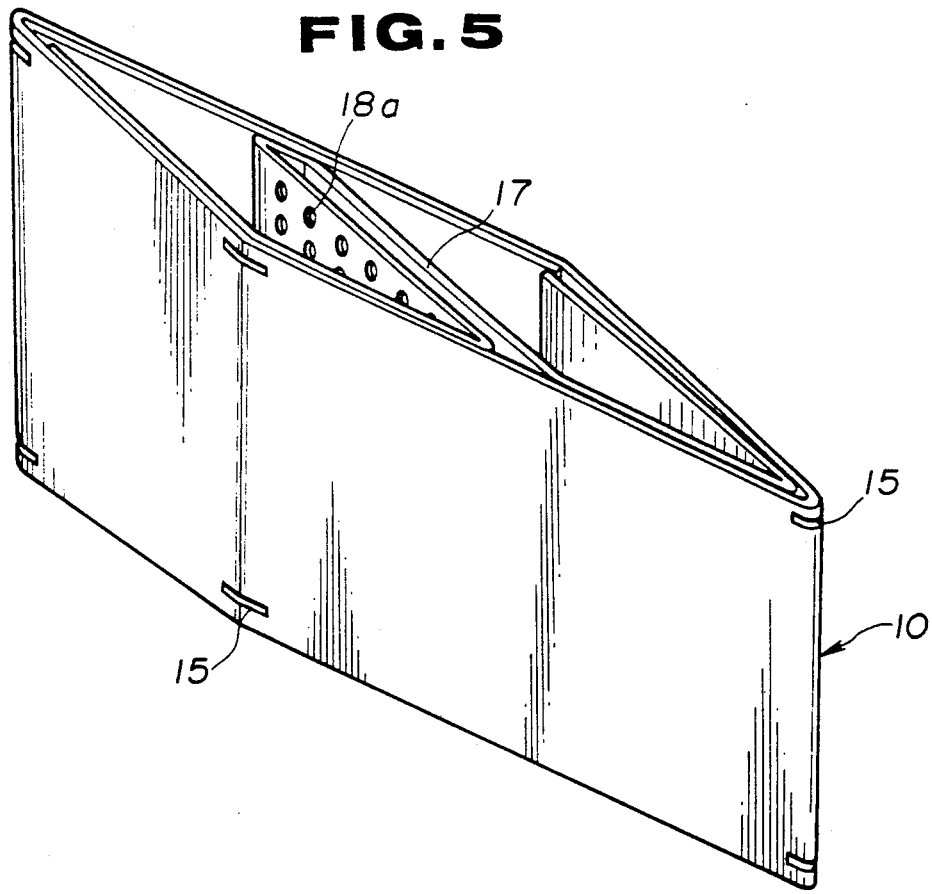

GARBAGE PROCESSING DEVICE

BACKGROUND OF THE INVENTION

1. Field of the Invention

The present invention concerns an improvement for a garbage disposing device used for fermentative degradation of discharged garbage, for example, from home kitchens and restaurant cookeries.

2. Prior Art

Heretofore, to dispose of garbage discharged from home kitchens, it was buried in pits dug, for example, in sunny gardens and, then, degraded by fermentation under the effects of micro-organisms in soil. However, such a natural method has become difficult in view of recent housing problems. Accordingly, garbage discharged from kitchens is recovered, under classification, and transported to incinerating plants and disposed of collectively by self-governing bodies.

However, along with the localization of the living population and varying food life, the amount of garbage discharged in urban districts has increased remarkably. Moreover, there has also been difficulty in installing new incinerating plants which may cause public pollution due to smoke or offensive odors. Thus, it appears that the disposal of garbage by existing plants will soon reach limit.

In view of the above, the present inventor has already proposed a garbage disposing device using a fermentation promoter, such as is shown in Japanese Patent Laid-Open Sho 62-225299, so that effective fermentation conditions for garbage can be provided artificially. The fermentation promoter used for forming the fermentation conditions is prepared by blending several kinds of mesophilic bacteria, growing and concentrating them while keeping the balance among the blended bacteria and adding an appropriate growing ingredient or a deodorizing agent to the concentrate. Such a promoter can effectively ferment garbage placed within a box of such a size as that of a home garbage bin.

That is, when a predetermined amount of the fermentation promoter is scattered upon and during charging the garbage in a container, the garbage in the container is effectively fermented with a lapse of time and effuses as a liquid. Accordingly, the residual amount of the garbage in the container after 1 to 2 months can be decreased to about 1/10, based on the total amount of the garbage charged.

Further, the present inventor has found that when the temperature in the inside of the container is kept at about 50° C., in addition to the use of the fermentation promoter, only the bacteria adaptable to such a temperature propagates preferentially and fermentation can be promoted further. As the source for the heat generation, quick lime (calcium oxide), coated with a starch membrane and formed into a granular shape, is used. When it is scattered on the garbage, the starch membrane is dissolved by water discharged from the garbage and the quick lime in the inside reacts with the water to strongly generate heat and is converted, itself, into lime (calcium hydroxide), and the exothermic heat is, thus, utilized. In this case, if the thickness of the starch membrane is controlled so as to make the heat of reaction between the quick lime and water different, it is possible to continuously generate heat for the garbage in the container over a long period of time. Any other suitable heat generating agent may also be used.

In the container described above, however, disposal of the water evaporated by the generation of heat is still insufficient.

OBJECT OF THE INVENTION

The present invention has been accomplished in view of the foregoing situation. Therefore, the object hereof is to provide a novel garbage disposing device capable of sufficiently disposing of evaporated water.

SUMMARY OF THE INVENTION

The foregoing object of the present invention can be attained by a garbage disposing device comprising:

a collapsible main body having a cylindrical configuration, the main body having an upper end face inclined at an angle capable of flowing water droplets downward;

a flat box-shaped member attachable to the main body so as to partition the inside thereof into a plurality of vertical chambers, the flat box-shaped member having a height such that a top end thereof protrudes above the main body, when attached to the main body, the member having a plurality of perforations formed in an upper portion of a wall surface thereof which faces each of the chambers and in the side wall of the top end, the member being provided with an upwardly open water-receiving port which protrudes through a front wall of the main body; and an opening/closing lid hingedly connected to the upper side of each of the chambers of the main body, the lid being attached along the angle of inclination of the upper end face of the main body and having an opening/closing end bent downwardly, the bent end being formed at an angle of inclination capable of flowing water droplets downward toward the water-receiving port of the flat box-shaped member.

When using the device according to the present invention, water absorbing material is placed at the bottom of the main body or the main body is installed directly on the ground, so that water discharged along with the fermentation process is absorbed thereinto and any water evaporated from the garbage is discharged through the small perforations formed in the flat box-shaped member to the outside. Any further water content is condensed on the inner surface of the opening/closing lid such that the water flows downward on one side to the opening/closing end which is slanted at a predetermined angle, and is collected from the water receiving port on the inside of the flat box-shaped member.

Further, in the present invention, the main body is partitioned by the flat box-shaped member into two or more chambers, so that garbage can be charged alternately to each of the chambers (for example, when one of the chambers is fully charged, garbage is switched to the other for continuous use). When a net-like bag is previously attached to the inside of each of the chambers and the garbage is charged therein, de-volumed residues remaining after disposal by the fermentation process can be taken out easily.

Further, the main body is collapsible so that is can be folded and transported in a compact manner.

DESCRIPTION OF THE ACCOMPANYING DRAWINGS

These and other objects, as well as advantageous features of the present invention will become apparent by reading the detailed description of the preferred embodiments according to the present invention with reference to the accompanying drawings, wherein:

FIG. 4 is a side elevational vertical cross-sectional view of the device;

FIG. 5 is a perspective view of the device in a collapsed state; and

DESCRIPTION OF THE PREFERRED EMBODIMENTS OF THE INVENTION

Figure 1:
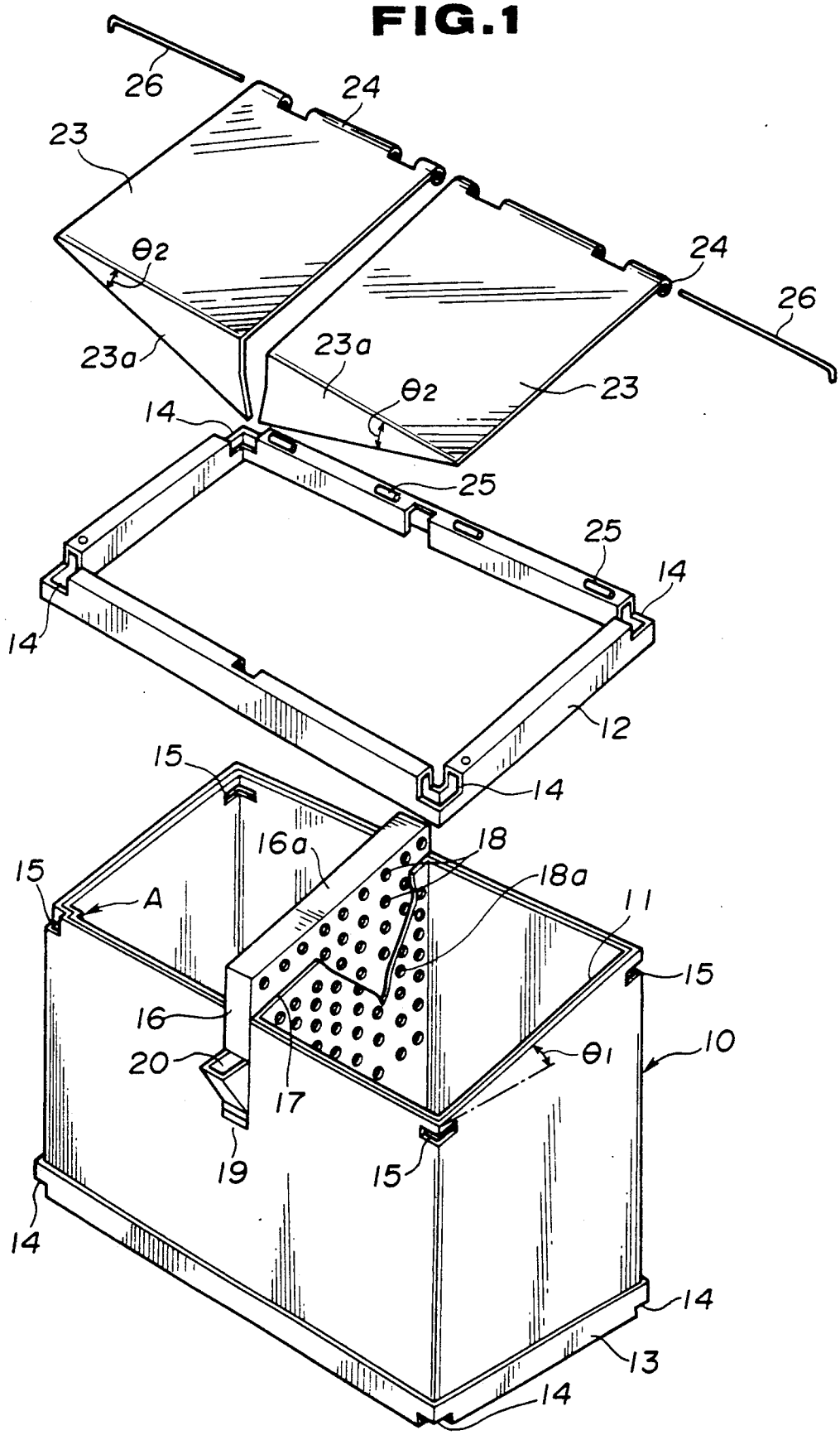
FIG. 1 is an exploded perspective view of a preferred embodiment of a garbage disposing device according to the present invention.

The present invention will now be described by way of its preferred embodiments illustrated in the accompanying drawings.

As shown in the drawing, and, in particular FIGS. 1-5, a main body 10 of a garbage disposing device is depicted as a long square box made of a corrugated plastic board, with an upper end face 11 being inclined at an angle $\theta_1$. The angle $\theta_1$ is so defined that water droplets, which condense on the inner surface of an opening/closing lid, which is described later, can flow downwardly spontaneously therefrom toward an opening/closing end. The angle $\theta_1$ is approximately 30°.

As shown in FIG. 5, the main body 10 is collapsible into a flat state for transportation or storage. The capacity of the main body 10 is determined depending upon, for example, the amount of garbage to be charged or the cycle for charging the garbage.

The main body 10 has reinforcing frames 12 and 13 fit to the outer edges at the upper end face 11 and a lower end face, respectively. Each of the reinforcing frames 12 and 13 is made of a plastic molding product and formed into a U-shaped cross-sectional shape. A recess 14 is formed at each of the corners, as shown. The main body 10 and the reinforcing frames 12 and 13 can be combined simply and effectively by first fitting the reinforcing frames 12 and 13 to the outer edges at the upper end face 11 and lower end face of the main body 10, respectively. Then by manually pushing inwardly a portion of the body 10 above or below each of the recesses 15, formed at each of the corners of the main body 10, with a finger, the pushed portion protrudes inward into a triangular shape, as shown in A, to engage the frame recess 14.

A flat box-shaped member 16 made of a plastic molding product is provided for partitioning the inside of the main body 10 into a plurality of vertical chambers, such chambers being illustrated in this embodiment. The flat box-shaped member 16 is attached to the main body 10 along a guide frame 17 disposed in the main body 10. The guide frame 17 is so made that it can be collapsed integrally with the main body 10.

The flat box-shaped member 16 has a height such that its top end 16a protrudes from the upper end face 11 of the main body 10 when it is attached to the main body 10, as shown.

Further, the flat box-shaped member 16 has a plurality of perforations 18a formed in the upper portion of the wall surface facing each of the chambers of the main body 10 and in the side wall of the protruding top end 16a.

The perforations 18a serve to take in gases, generated in the main body chamber, such as the stem released from the garbage, and then discharge them from the top end 16a to the outside. Correspondingly, perforations 18 in the flat box-shaped member 16 are also formed in the guide frame 17.

Figure 3:
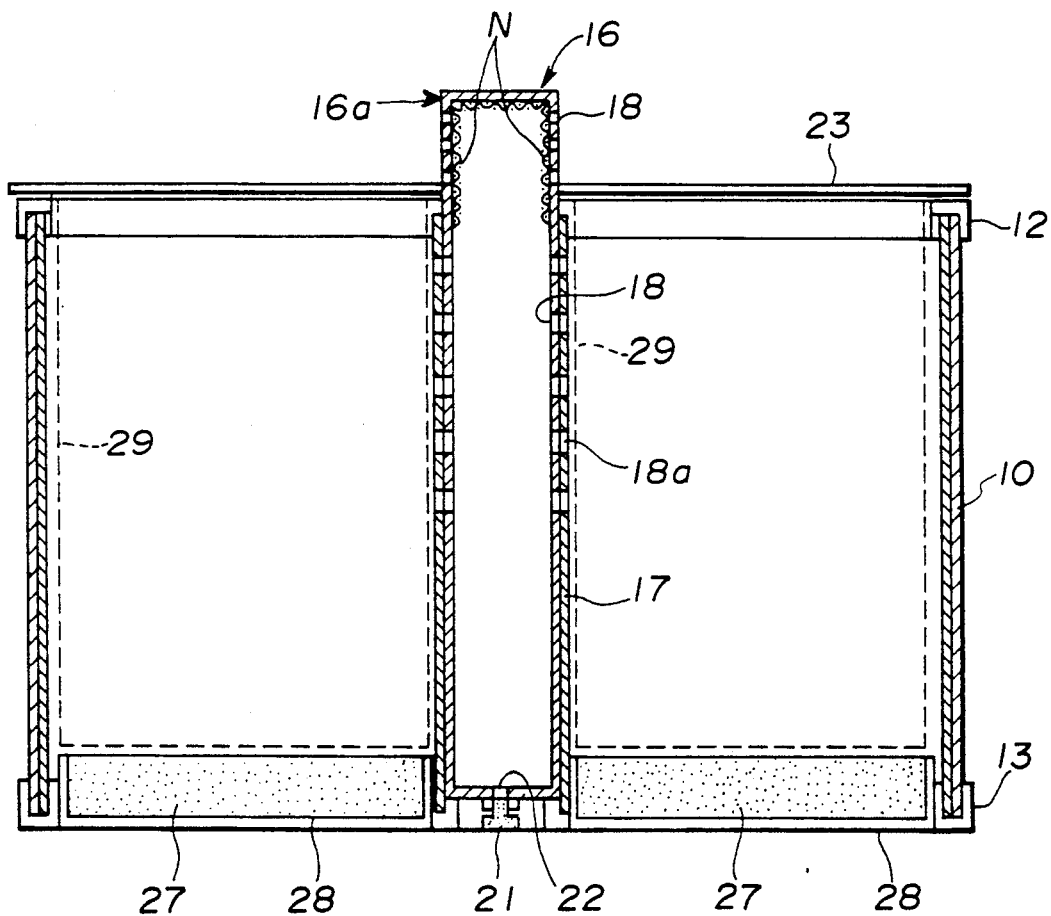
FIG. 3 is a front elevational vertical cross-sectional view of the device.

As shown in FIG. 3, since the perforations 18a are opened to the side wall of the top end 16a of the flat box-shaped member 16, small insects such as flies may possibly intrude through the apertures. It is, accordingly, preferred to append a red net N to the inner surface of the perforations 18a in the top end 16a in order to prevent intrusion. It has been confirmed that the use of a red net is effective for repelling insects such as flies.

A water-receiving port 20 is disposed at the front end face to the flat box-shaped member 16. The port 20 protrudes from a recess 19 formed at the front wall of the main body 10 and opens upwardly. Further, a drain port or hose 22 is disposed at the bottom of the flat box-shaped member 16, which is usually closed by a plug 21.

As noted, the inside of the main body 10 is partitioned by the flat box-shaped member 16 into two chamber, although the present invention is not always restricted only to two chambers, so that the garbage can be treated alternately in each of them.

An opening/closing lid 23 covers the upper end face of each of the chambers of the main body 10. The lid 23 is made of a metal or plastic plate. The lid 23 is hinged to the main body 10 by axially aligning a tubular portion 24 at the base end of the lid 23 with a tubular portion 25 disposed on the higher side of the upper end face 11 for each of the chambers of the main body 10, i.e. upper reinforcing member 12 in this embodiment, and, then, passing a hinge shaft 26 therethrough. In this way, the opening/closing lid 23 is attached along the angle of inclination of the upper end face 11 of the main body 10 so as to incline downwardly on one side.

Further, an opening/closing end 23a of the opening/closing lid 23 is bent downwardly. The bent end 23a is slanted at an angle of inclination $\theta_2$ toward the water receiving port 20 of the flat box-shaped member 16 so that water droplets can flow downwardly to the port 20. The angle $\theta_2$ is also defined to be about 30°. Water droplets which condense on the inner surface of the opening/closing lid 23 flow spontaneously downwardly along the slope of the lid 23 toward the opening/closing end 23a. Water droplets collected at the opening/closing end 23a are then turned downwardly along the end edges, dripped from the inclined lower end to the water receiving port 20, and, then, contained within the flat box-shaped member 16.

A water absorbing material 27 is placed on a tray 28 disposed at the bottom of the main body 10. The absorbing material 27 is used for absorbing water discharged along with the fermentation. The absorbing material is commercially available under the trade name of Vermiculite. When the main body 10 is installed outdoors, the ground soil, per se, serves as a substitute for the absorbing material 27.

A net-like bag 29 is previously attached to the inside of each of the chambers of the main body 10. The bag is used to facilitate the recovery of residues of the disposed garbage, the volume of which is reduced under the effect of fermentation. The net-like bag 29 allows the water discharged from the garbage to permeate therethrough. The net-like bag 29 is a perforated bag made of a plastic film in which the pore size for each of the apertures is greater than 6 mmϕ. If the pore size is less than 6 mmϕ, the pores may be clogged with oil membrane or the like.

Figure 6:
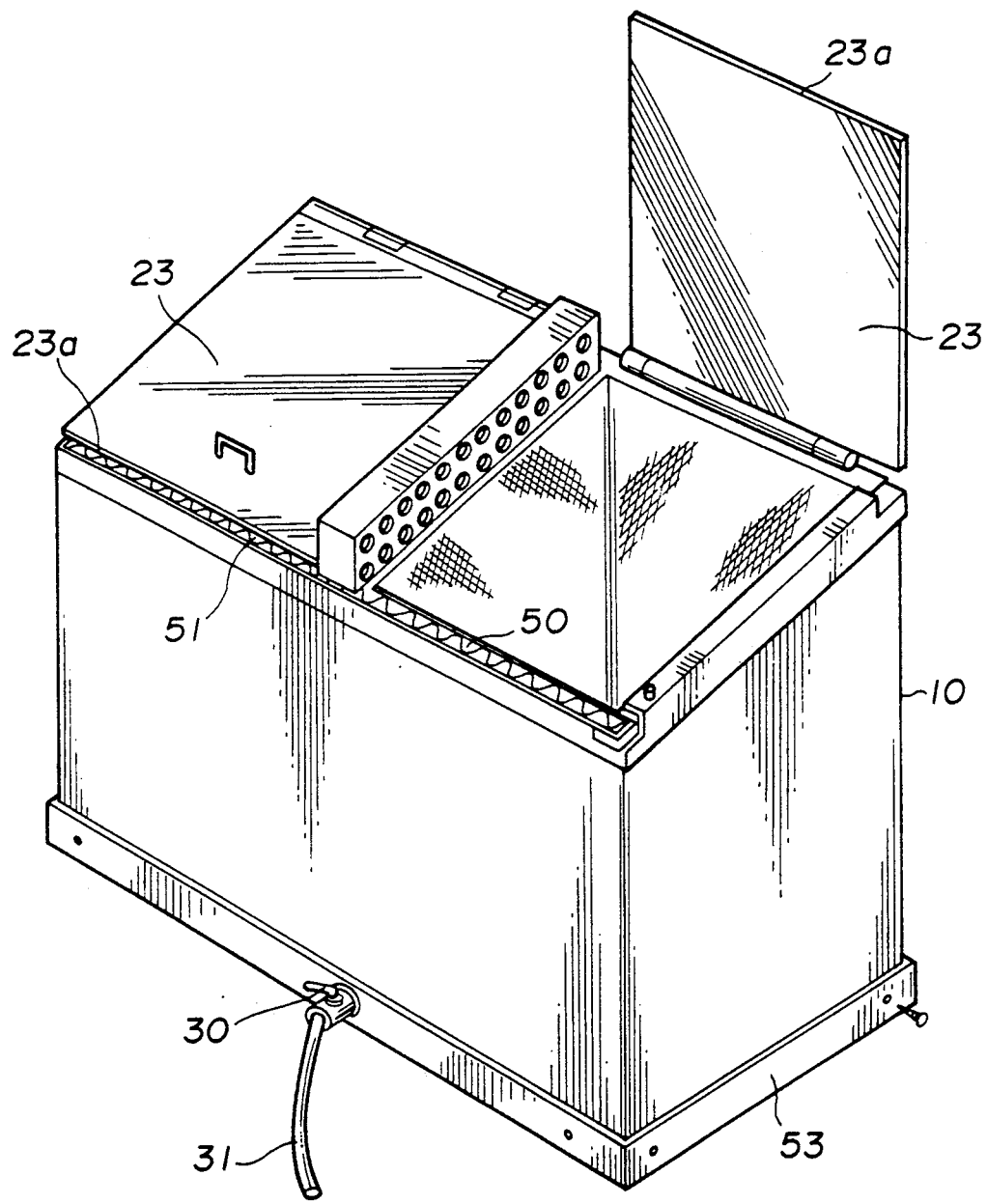
FIG. 6 is a perspective view of a second embodiment of a garbage disposing device according to the present invention in a state of use.

FIG. 6 shows another embodiment of the present invention. The fundamental constitution of this modified embodiment is substantially the same as that of the previous embodiment, except that the opening/closing end 23a of the opening/closing lid 23 is aligned with grooves 50 in the core of the currugated plastic board of the main body 10 so that the grooves 50 in the board core can be unilized as a water receiving port 51. In this embodiment, water flowing into the grooves 50 of the board core is collected by the lower reinforcing frame 53. Water is drained by means of a cock 30, disposed in the water collecting portion, by way of a hose 31.

Description will now be made to the method of assembling and using the device according to the present invention.

The main body 10 is initially collapsed as shown in FIG. 5. Then, the main body 10 is developed into a square box-like configuration. The lower reinforcing frame 13 is fit to the circumferential edge at the lower end face of the main body 10. Subsequently, each portion below the recess, formed at each corner of the main body, is pushed inward to engage the recess 14 of the lower reinforcing frame 13. Then, the flat box-shaped member 16 is inserted into the guide frame 17, formed in the main body 10, to partition the inside of the main body 10 into two chambers. Then, the upper reinforcing frame 12 is fit to the upper end face 11 of the main body 10. Each portion above the recess, formed at each corner, is pushed inward to engage the recess 14 of the upper reinforcing frame 12 in the same manner.

Subsequently, the opening/closing lid 23 is hinged to the higher side of the upper reinforcing frame 12 and attached along the slope at the upper end face 11 of the main body 10 so that it is inclined downwardly on one side. Then, the tray 28 is placed at the bottom of the main body 10, on which the water absorbing material 27 is placed. The net-like bag 29 is attached to the inside of each of the chambers. The device of the invention has thus been assembled completely.

Figure 2:
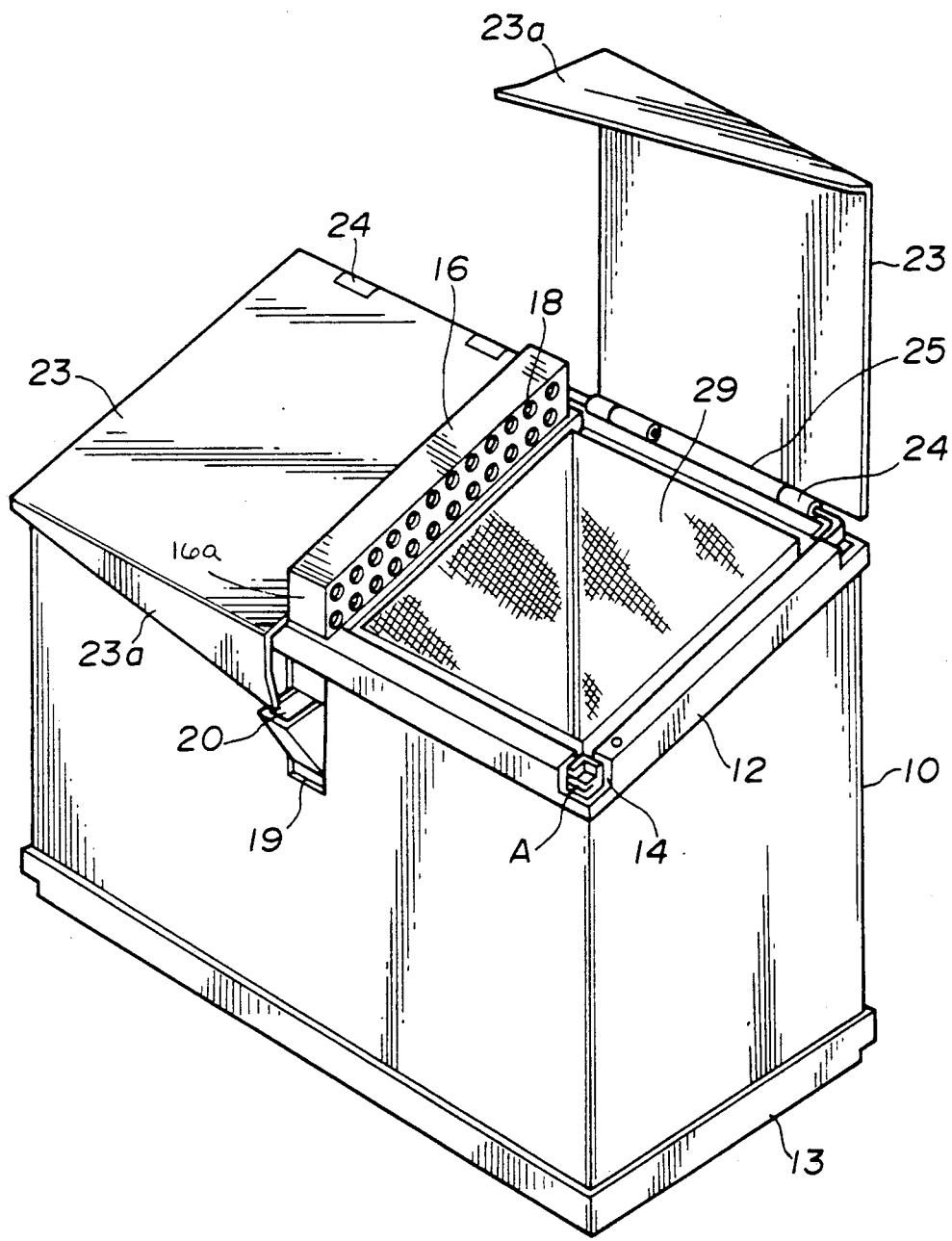
FIG. 2 is a perspective view of the device of FIG. 1 in a state of use.

In use, the opening/closing lid 23 for one of the chambers of the main body 10 is opened, as shown in FIG. 2. Then, a predetermined amount of garbage is charged, over which a fermentation promoter (not illustrated) and a heat generating agent (not illustrated) are scattered, each in a predetermined amount. The opening/closing lid 23 is then closed.

As the heat generating agent, quick lime coated with a starch membrane and formed into a granular shape can be used satisfactorily. The operation for scattering the predetermined amount of the fermentation promoter and the heat generating agent is conducted on every charging of the garbage. After several weeks or several months, when the inside of one of the chambers is fully charged, garbage is charged into the other chamber. In this case, fermentation for the garbage that has been charged into one of the chambers is promoted under the effect of the fermentation promoter and the heat generating agent with the elapse of time. The garbage charged in the main body 10 undergoes fermentation in the main body 10 kept at about 50° C. under the effect of the heat generating agent. Water discharged from the garbage, during fermentation, is absorbed into the water absorbing material 27, while a portion of evaporated water is released through the performation 18 of the flat box-shaped member 16 to the outside of the main body 10.

Further, water which condenses into droplets on the inner surface of the opening/closing lid 23 flows spontaneously downwardly along the slope, at the inner surface thereof, toward the opening/closing end 23a and, finally, is contained in the flat box-shaped member 16.

As a result, the volume of the garbage fully charged to the inside of one of the chambers is reduced to about 1/10 until the other chamber is fully charged with the garbage (about 1 to 2 months). The water content in the garbage residue is, also, decreased remarkably.

In this case, since drained water of fermentation or residue emits no offensive odors, there is neither the trouble of being bothered by offensive odors, nor contamination to hands or clothes during handling, such as when discarding the garbage or exchanging the chambers of the main body.

While the present invention has been described with reference to the preferred embodiments, the invention is not restricted only thereto and various changes and variations may be made without departing from the spirit of scope of the invention.

For example, the cross sectional shape of the outer container is not restricted to the rectangular shape. Other polygonal or circular cross-sectional shapes may be used.

As has been described above, the garbage disposing device according to the present invention comprises a main body 10 in the form of a collapsible elongate square cylinder with an upper end face 11 being formed at such an angle of inclination as to be capable of flowing water droplets downwardly. The device includes a flat box-shaped member 16 that can be attached to the main body 10 so as to partition the inside of the main body 10 into a plurality of vertical chambers, the member having a height such that its top end protrudes thereabove when attached to the main body 10. The main body 10 has a plurality of perforations in the upper portion of the wall surface thereof which faces each of the chambers, and in the side wall of the top end. A water-receiving port protrudes from the front wall of the main body 10 and opens upwardly. A water drain port 22 is disposed into the bottom of the main body 10. An opening/closing lid 23 is hinged to the higher side of each of the chambers of the main body 10, the lid 23 being attached along the angle of inclination of the upper end face 11 of the main body 10 and has an opening/closing end bent downwardly at such an angle of inclination that water droplets can flow downwardly to the water-receiving port 20 of the flat box-shaped member 16.

Accordingly, water evaporated from the garbage is discharged through the perforations of the flat box-shaped member 16 to the outside; water condensed on the inner surface of the opening/closing lid 23 is introduced along the slope to the opening/closing end, and, then, flows downward along the angle of inclination of the opening/closing end and is then contained from the water-receiving port 20 into the flat box-shaped member 16, so that evaporated water can be disposed.

Further, since the main body is partitioned by the flat box-shaped member 16 into a plurality of vertical chambers, the garbage can be contained and disposed alternately in each of the chambers, such that a fully discharged chamber can be replaced with the other chamber for continuous use. Thus, effective disposal is enabled.

Furthermore, the main body is collapsible and can be transported or stored in a compact, folded state.

What is claimed is:

1. A garbage disposing device, comprising:
   (a) a main body having an upper end face and a front wall, the upper end face being inclined at an angle, the angle being sufficient to permit water droplets to flow downwardly therealong.
   (b) a flat box-shaped member emplaceable within the main body, the member dividing the main body into a plurality of vertical chambers, the member having a wall surface which faces each of the chambers and a top end having a side wall, the member projecting above the main body when disposed therewithin, the wall surface and the side wall having a plurality of perforations formed therein,
   (c) a water-receiving port formed in the device, and
   (d) an opening/closing lid rotatably mounted to the main body proximate the upper end face, the lid being attached along the angle of inclination, the lid including a downwardly bent end which permits the flowing of water droplets into the water receiving port.

2. The device of claim 1 wherein:
   the main body is collapsible.

3. The device of claim 1 wherein:
   the angle of inclination of the upper end face is about 30°.

4. The device of claim 1 wherein:
   the water receiving port is formed in the flat box-shaped member, the port protruding through the front wall of the main body.

5. The device of claim 4 wherein:
   the main body is collapsible.

6. The device of claim 5 wherein:
   the main body is formed from a corrugated plastic board, the grooves of the board being vertically disposed, the grooves defining the water-receiving port, the device further comprising:
   means for collecting and discharging water flowing into the grooves.

7. The device of claim 1 wherein:
   the main body is an elongate rectangular body, the flat box-shaped member intersecting the longitudinal direction of the body.

8. The device of claim 1 which further comprises:
   a perforated guide frame disposed within the main body, the flat box-shaped member being attached to the main body along the guide frame.

9. The device of claim 8 wherein:
   the guide frame is integral with the main body, the guide frame and body being collapsible.

10. The device of claim 1 which further comprises: a red net associated with the box-shaped member to prevent insects from accessing the perforations.

11. The device of claim 1 which further comprises:
    means for hingedly connecting the lid to the main body, the lid being rotatable about the means for hingedly connecting.

12. The device of claim 1 which further comprises:
    a water absorbing material disposed within the main body.

13. The device of claim 12 which further comprises:
    a tray disposed within each chamber, the water absorbing material being disposed within each tray.

14. The device of claim 1 wherein:
    the angle of inclination of the upper end face and the lid are substantially equal.

* * * * *